US006118254A

United States Patent [19]
Faulk

[11] Patent Number: 6,118,254
[45] Date of Patent: Sep. 12, 2000

[54] BATTERY CHARGE CONTROL ARCHITECTURE FOR CONSTANT VOLTAGE MAXIMUM POWER OPERATION

[75] Inventor: Richard A. Faulk, Cypress, Tex.

[73] Assignee: Compaq Computer Corporation, Houston, Tex.

[21] Appl. No.: 09/364,122

[22] Filed: Jul. 30, 1999

[51] Int. Cl.[7] .................................................. H02J 7/04
[52] U.S. Cl. ........................................ 320/141; 320/128
[58] Field of Search ................................ 320/128, 141, 320/152

[56] References Cited

U.S. PATENT DOCUMENTS

| | | | |
|---|---|---|---|
| 5,541,490 | 7/1996 | Sengupta et al. | 320/160 |
| 5,561,361 | 10/1996 | Sengupta et al. | 320/152 |
| 5,583,417 | 12/1996 | Yuen | 320/160 |
| 5,629,604 | 5/1997 | Sengupta et al. | 320/152 |
| 5,739,667 | 4/1998 | Matsuda et al. | 320/161 |
| 5,963,015 | 10/1999 | Lee | 320/128 |
| 6,008,629 | 12/1999 | Saeki et al. | 320/140 |
| 6,037,756 | 3/2000 | Pong | 320/128 |
| 6,049,193 | 4/2000 | Chien | 320/128 |

*Primary Examiner*—Peter S. Wong
*Assistant Examiner*—Pia Dibbits
*Attorney, Agent, or Firm*—Fletcher, Yoder & Van Someren

[57] ABSTRACT

A circuit and method for charging batteries while a power supply also powers a dynamically varying load. All power in excess of that required by the load is used by a power converter to charge the batteries. The circuit advantageously allows the load to change from external power to battery power without switching delays.

35 Claims, 4 Drawing Sheets ic # BATTERY CHARGE CONTROL ARCHITECTURE FOR CONSTANT VOLTAGE MAXIMUM POWER OPERATION

BACKGROUND AND SUMMARY OF THE INVENTION

The present invention relates to battery charging from a constant voltage source which is also powering a dynamically varying load.

BACKGROUND: PORTABLE COMPUTERS

Portable personal computers were introduced in the early 1980s, and proved to be very useful and popular. As this market has developed, it has become increasingly clear that users strongly desire systems to have small volume, small weight, physical durability, and long battery-powered lifetime. Users continue to demand more features, longer time between recharges, and lower weight and volume. This combination of demands is difficult to meet. Obtaining lower weight and volume generally involves design tradeoffs that may reduce time between battery recharges. Moreover, in about 1990, another smaller generation of portable computers, referred to as "notebook" computers, began to appear; and even smaller computers are now appearing. These smaller form factors have only exacerbated the difficulty of the above tradeoffs.

BACKGROUND: PORTABLE COMPUTER POWER SUPPLIES

Because portable computers are meant to be powered (at least occasionally) by batteries, the power supply in a portable computer is designed to maximize battery runtime by minimizing power waste. In general, power consuming components such as shunt or series regulators are unnecessary because battery voltage is predictable.

Most portable computers rely on some type of battery charger so that rechargeable batteries can be used for power. The battery charger is essentially an AC/DC power supply. Line voltage AC goes in and low voltage DC comes out. The charger's output voltage is usually higher than that of the system's battery output voltage so that the batteries can be charged to their full capacity.

The battery charger/power supply typically is a self-contained unit external to the portable computer, although internal units are known to exist. Although they usually contain more than just a transformer, most people call these external power supplies "AC adapters." Manufacturers favor the external power supply design because it moves unnecessary weight out of, and eliminates dangerous voltage levels from, the portable computer.

In the usual scenario, the battery charger supplies power to run the portable computer and to charge the batteries. Because manufacturers try to minimize the cost and size of the power supply, the battery charger's output power capability is generally the larger of the maximum needed to charge the batteries or the maximum power to be used by the portable computer. The charger is generally not able to charge the battery at a maximum rate and supply full power to operate the computer.

Most PC power supplies are of the same basic design. The technical name for this design is Constant Voltage Switching power supplies, usually known simply as switching supplies. Constant voltage means that the output voltage is always the same as the output current changes with changing output power requirements. Half-Bridge, Forward Converting, or Flyback are types of Constant Voltage Switching designs. Switching refers to the regulation technique and gives a broad design definition. The main advantages of these power supplies over other designs are their high efficiency, low heat dissipation, small size, and affordable prices.

BACKGROUND: BATTERY CHARGING FROM A CONSTANT VOLTAGE SOURCE WITH AN ATTACHED DYNAMICALLY VARYING LOAD

Source with an Attached Dynamically Varying Load Prior art methods of charging a battery from a constant voltage source with an attached dynamic or variable load include: 1) do not allow charging when the computer is on; 2) only charge with known power in excess of that required by the computer; 3) use a constant power charge source; 4) develop complex hardware/firmware to try to develop a closed-loop control method.

As an example of 2) above, when using a 40 Watt power supply to provide power to a device that has a maximum power consumption of 30 Watts, the charging circuit would be constructed so that the excess 10 Watts is used to charge the battery. Another embodiment of this method is known as "trickle" charging.

BACKGROUND: ARBITRATION FOR BATTERY CHARGING

One prior art method of charging a battery while a dynamically varying load is connected to a constant voltage source is to use arbitration between the battery and the dynamic load. Typically a microcontroller or microprocessor is used to allocate power from the constant voltage source to the battery according to the demand of the dynamic load.

Arbitration requires very fast circuitry and decision-making because the dynamic load can go from standby (no load) to maximum load in extremely short time periods. The arbitrator must rapidly make a decision to stop charging the battery or the voltage source will crash because the battery and load together demand too much current (dragging the voltage source below the 10V knee shown in FIG. 3).

BACKGROUND: OVERCHARGE PROTECTION DURING BATTERY CHARGING

Batteries can be damaged by overcharging. Overcharging may occur when a charger continues to supply current to a battery after the battery is fully charged. It may also occur when a battery, although not yet fully charged, is charged too fast. For obvious reasons, it is desirable to charge batteries at the fastest rate possible that will not damage the battery. A practical difficulty with any battery charging scheme is how to determine when the battery is being overcharged.

Known methods of avoiding battery overcharge include: using RC timing circuits to control charge time; using a microcontroller to monitor and limit current to the battery; and only allowing "trickle" charging of the battery.

Most battery charging schemes look at battery voltage, current, and/or temperature and control a power converter's voltage, current or power output according to some algorithm based on the physical properties of the battery being charged. Lithium batteries, for example, would require a different algorithm than lead-acid batteries.

Along with their other disadvantages, prior art charge systems are generally slow to respond to changes in the input signals to the charge controller, they typically only regulate their output, and they generally have only two charge modes: quick and trickle.

The following are known methods for determining when a rechargeable battery is adequately charged: monitoring when the voltage of the rechargeable battery reaches a maximum voltage value; monitoring when the temperature of the battery reaches a maximum temperature value; monitoring when the rate of temperature change of the rechargeable battery reaches a maximum rate of temperature change; and using the characteristic that voltage of the rechargeable batteries slightly drops when charging is completed (the so-called –DV characteristic). However, three of the monitoring methods are practical only for fast charging. When charging over a long time, that is charging with a small charging current in comparison with the charge capacity, control by monitoring maximum temperature, control by monitoring the maximum rate of temperature change, and control by monitoring DV characteristic are not practical options. Thus the only method that is known to be practical for a charger that has a trickle charge mode is monitoring when the rechargeable battery voltage reaches a maximum value that should not be exceeded.

BATTERY CHARGE CONTROL ARCHITECTURE FOR CONSTANT VOLTAGE MAXIMUM POWER OPERATION

The present application discloses a new architecture for optimal battery charging in the presence of a varying load. A primary power supply (e.g. a conventional AC adapter with a voltage-regulated switch-mode converter) drives a power bus, which supplies both the load and a battery-charging regulator. The battery-charging regulator limits battery charging current with respect to the voltage on the power bus (and possibly other parameters). If no current is being drawn, the primary power supply drives the bus to a first voltage setpoint (e.g. 19V in FIG. 3), and the battery-charging regulator will never draw enough current to pull the power bus below a second voltage setpoint (e.g. 18V in FIG. 3, which is at or near a point of maximum power output on the characteristic curve shown). Thus if the load draws enough current to pull the power bus below the second voltage setpoint, the battery charging circuit will draw essentially no power; and if the battery needs charging, the battery charging circuit will draw enough current (up to the maximum needed for the battery) to operate the primary power supply at or near its peak power output. Thus battery charging speed is automatically maximized under all conditions, without any requirement for complex logic. A further feature, in the presently preferred embodiment, is that the battery charging current is sensed through a charge control inductor. This permits the battery charging regulator to begin regulation of charging current without any additional circuitry (in other words without decision-making circuits such as microprocessors, supervisory or arbitration circuits) to provide arbitration or overcurrent protection. The charge system self-regulates to use the maximum power available from the charge source, thereby allowing maximum battery charge rate with the computer running (i.e. it allows fast battery charging when the computer is running). Additionally, the system allows the load to transition from the external charge source to battery power with no switching delay.

The disclosed innovations, in various embodiments, provide one or more of at least the following advantages:

charge regulation can be based on power converter output current, voltage, power, or input current;

the charge system will automatically begin regulation of battery charge current when an external power source is applied;

no circuitry additional to the basic power converter is necessary to provide arbitration, overcurrent protection, or optimization of power utilization as dynamic load changes;

the charge system self-regulates to maximum power available from the charge source, allowing optimal battery charge rate when the charge source is providing power to a dynamically varying load; and the charge system holds the charge source near its maximum power output by dynamically adjusting battery charge current.

when an external power source no longer provides power, the charge system allows battery current to flow to the load without switching delays the charge system may be easily adapted for use with a microcontroller or microprocessor

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
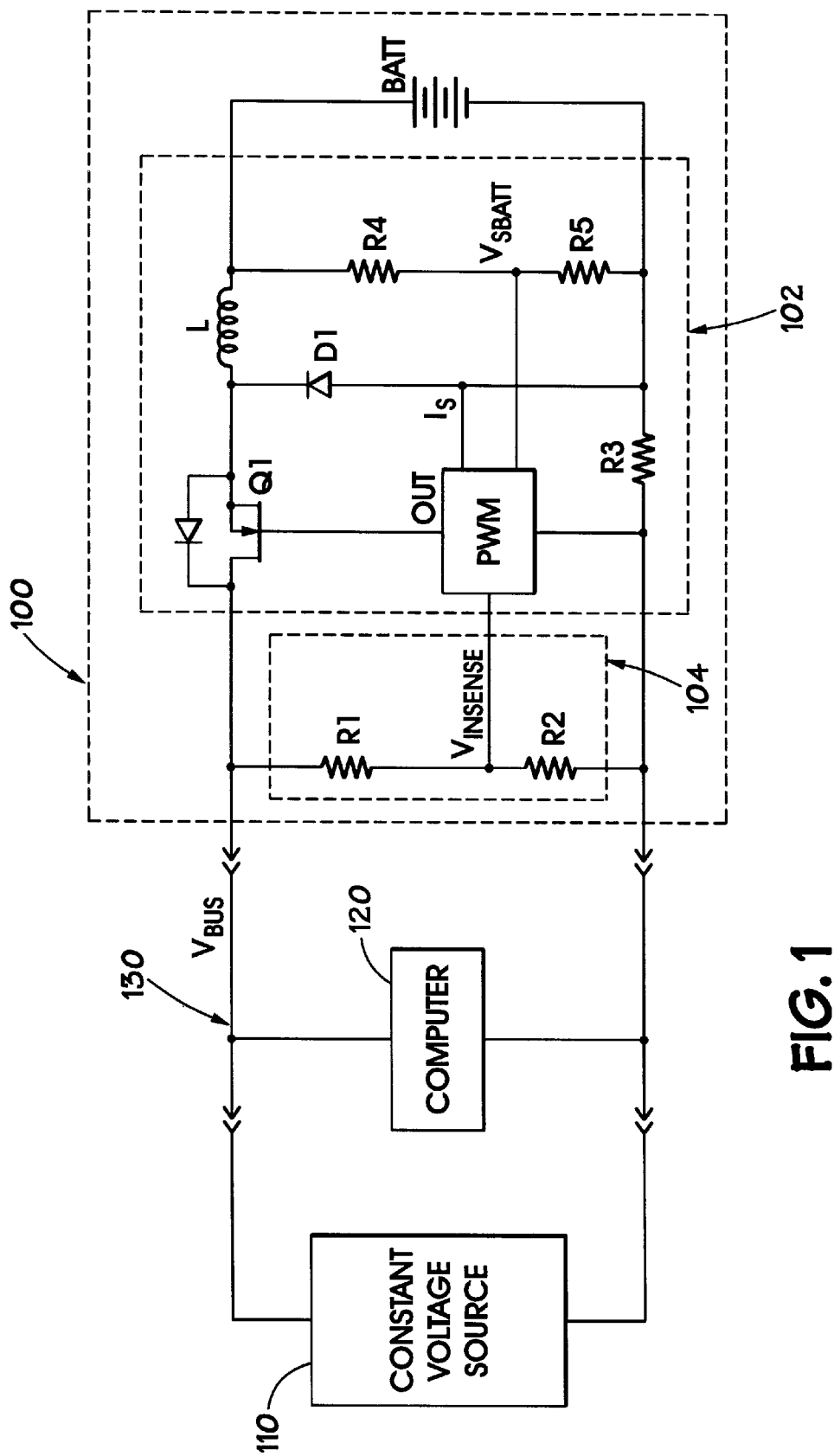
FIG. 1 depicts an embodiment of the innovative charging circuit.

The numerous innovative teachings of the present application will be described with particular reference to the presently preferred embodiment (by way of example, and not of limitation), in which:

FIG. 1 shows a preferred embodiment of the present invention. A constant voltage source 110 provides power to a power bus VBUS that is functionally connected to a computer 120. A battery module 100 also is connected to power bus VBUS. The computer 120 acts as a dynamically varying load on constant voltage source 110.

The battery module 100 comprises a sense network 104 for detecting how much charge is available for charging the battery, a power converter 102 for regulating charge current to the battery, and a battery BA. The sense network 104 incorporates resistors R1 and R2. A sense signal $V_{insense}$, proportional to the voltage on VBUS, is input from the sense network 104 to the power converter 102.

The power converter 102 incorporates: a standard Buck converter comprised of transistor Q1, pulse-width modulator PWM, diode D1, and inductor L; resistor R4; and resistor R5. The power converter can charge the battery in constant current, constant voltage, or constant power mode as desired. Resistors R4 and R5 provide a signal $V_{sbatt}$ which is proportional to the voltage across battery BA. D1 and R3 provide a signal $I_S$ which is proportional to the current through inductor L. The signal $I_S$ is input to PWM for comparison with a fixed reference current IMAX. To regulate battery charge, PWM controls Q1 (thereby controlling the magnitude of charge current to batter BA) via an output signal OUT. $I_{lim}$, $V_{inlim}$, $V_{sbatt}$, and $P_{lim}$.

R1 and R2 add a new regulation scheme to move current charge when sharing the bus with a dynamic load such as a notebook computer. PWM will regulate the charge such that the voltage bus VBUS is maintained at 18 Volts, 1 Volt lower than the CV source 110 normal regulation point of 19 Volts. This holds the charge source 110 at its maximum power and ensures that the battery BA gets the maximum rate of charge and dynamically controls this as computer 120 load changes.

Figure 2:
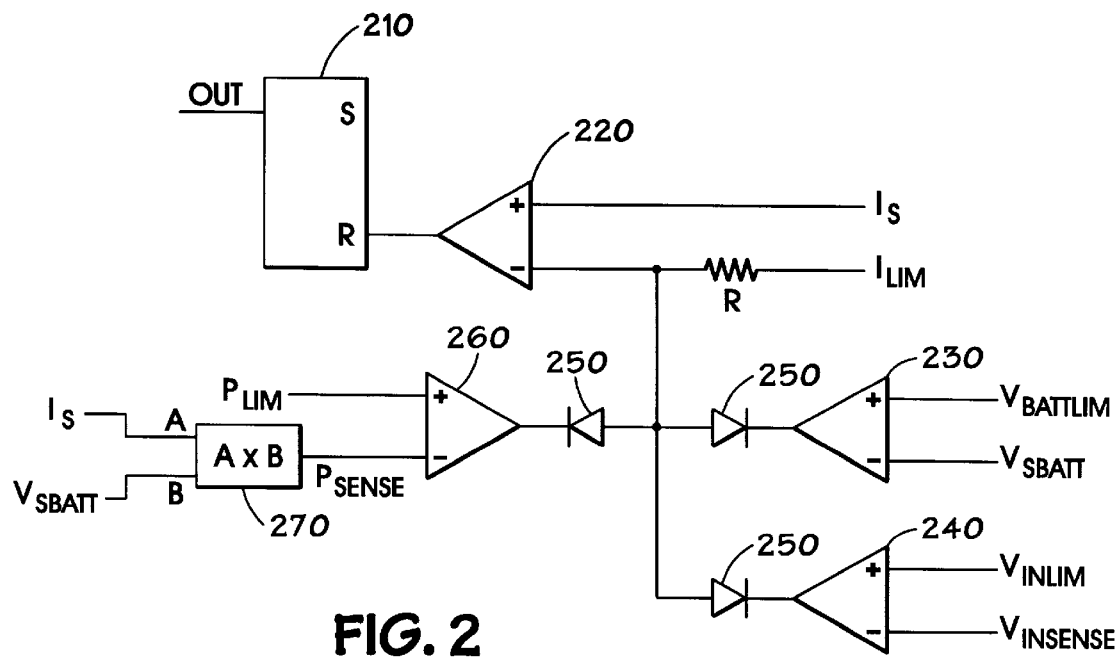
FIG. 2 shows an embodiment of a pulse-width modulator (PWM) control circuit for the charging circuit depicted in FIG. 1.

FIG. 2 depicts a preferred implementation of the pulse-width modulator control circuit PWM that is shown in block form in FIG. 1. A signal $I_S$, proportional to the current through inductor L, is input to the non-inverting terminal of a first op-amp 220. A reference signal $I_{lim}$, proportional to a maximum charging current that should not be exceeded, is input via resistor R to the inverting terminal of op-amp 220. The inverting terminal can be pulled low by either op-amp 230, op-amp 240, or op-amp 260. If $P_{sense} < P_{lim}$, $V_{sbatt} < V_{battlim}$, and $V_{insense} < V_{inlim}$, then op-amp 220 is free to regulate $I_S$. For simplicity, feedback networks that allow op-amps 230, 240, and 260 to operate in the linear region are not shown.

Note that op-amp 220 is configured as a comparator. A comparator circuit is one that provides an indication of the relative state of two input voltages. If one input is a reference voltage and the other an unknown, the comparator output will indicate whether the unknown voltage is above or below the reference voltage. If the voltage at the inverting terminal is higher than the voltage at the non-inverting terminal, the output voltage will be below (at a negative saturation limit) the voltage at the non-inverting terminal. If the voltage at the inverting terminal is lower than the voltage at the non-inverting terminal, the output voltage will be above (at a positive saturation limit) the voltage at the non-inverting terminal.

A signal $V_{sbatt}$, proportional to the voltage of battery BA, is input to the inverting terminal of op-amp 230. A reference voltage $V_{battlim}$ is input to the non-inverting terminal of op-amp 230. $V_{battlim}$ may be dependent on physical characteristics of BAT, such as battery chemistry. When $V_{sbatt}$ rises above $V_{battlim}$, the output of op-amp 230 goes low, causing its associated diode 250 to become forward biased. When the diode 250 becomes forward biased, current is drawn away from $I_{lim}$, lowering the reference current limit seen by comparator 220.

A signal $V_{inlim}$, proportional to VBUS voltage, is input to the non-inverting terminal of op-amp 240. A reference voltage $V_{insense}$ equal to (desired VBUS voltage)*(R2/(R1+R2)) is input to the inverting terminal of op-amp 240. In this embodiment the desired VBUS voltage is 18 Volts. When $V_{inlim}$ falls below $V_{insense}$, the output of op-amp 240 goes low.

A signal $P_{sense}$, proportional to the power output of the battery charger, is input to the inverting terminal of op-amp 260. A reference voltage $P_{sense}$ is input to the non-inverting terminal of op-amp 260. $P_{lim}$ is proportional to the maximum power that the charge source (an AC adapter for example) can provide. In the embodiment shown in FIG. 2, $P_{lim}$ is calculated (from $V_{sbatt}$ and/or $I_S$) by power detection circuit 270. Typical power detection circuits 270 are a multiplier or a linear approximator. When $P_{sense}$ rises above $P_{lim}$, the output of op-amp 260 goes low, causing its associated diode 250 to become forward biased. When the diode 250 becomes forward biased, current is drawn away from $I_{lim}$, lowering the reference current limit seen by comparator 220.

When the output of either op-amp 230, op-amp 240, or op-amp 260 goes low, it drags the inverting input of comparator 220 lower regardless of the value of $I_{lim}$. When the inverting input of op-amp 220 goes low, it will be below the $I_S$ voltage at the non-inverting terminal of op-amp 220. As discussed above, when the non-inverting terminal is at a higher voltage than the inverting terminal, the output of an op-amp goes high. Thus the output of comparator 220 will go high, causing the SR flip-flop to reset signal OUT. When OUT goes low, transistor Q1 is shut off and no charge current flows from VBUS to battery BA.

Note that if $I_{lim}$ is set too high, VBUS will sag below 18 Volts and the $V_{insense}$ op-amp 240 will pull the current limit back to regulate VBUS to 18 Volts.

Figure 3:
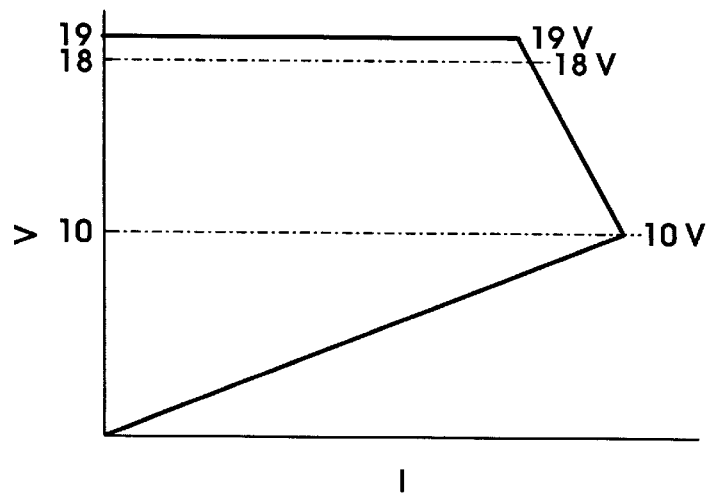
FIG. 3 shows a voltage to current relationship for a constant voltage source AC/DC converter.

FIG. 3 depicts the voltage/current relationship of the constant voltage source 110 in the preferred embodiment. As a dynamic load increases, the battery charger voltage will begin to decrease after a certain critical current level is exceeded. Because maximum power transfer from the battery charger occurs at this break point where the voltage begins to decrease, it is desirable to hold the battery charger at this break point by adjusting current demand of the charger's loads. In the embodiment shown in FIG. 2, op-amp 240 uses the $V_{insense}$ signal to regulate the charge current such that power supply voltage is kept just below the break point. The knee at 10V is caused by a decrease in the dynamic load.

Figure 4:
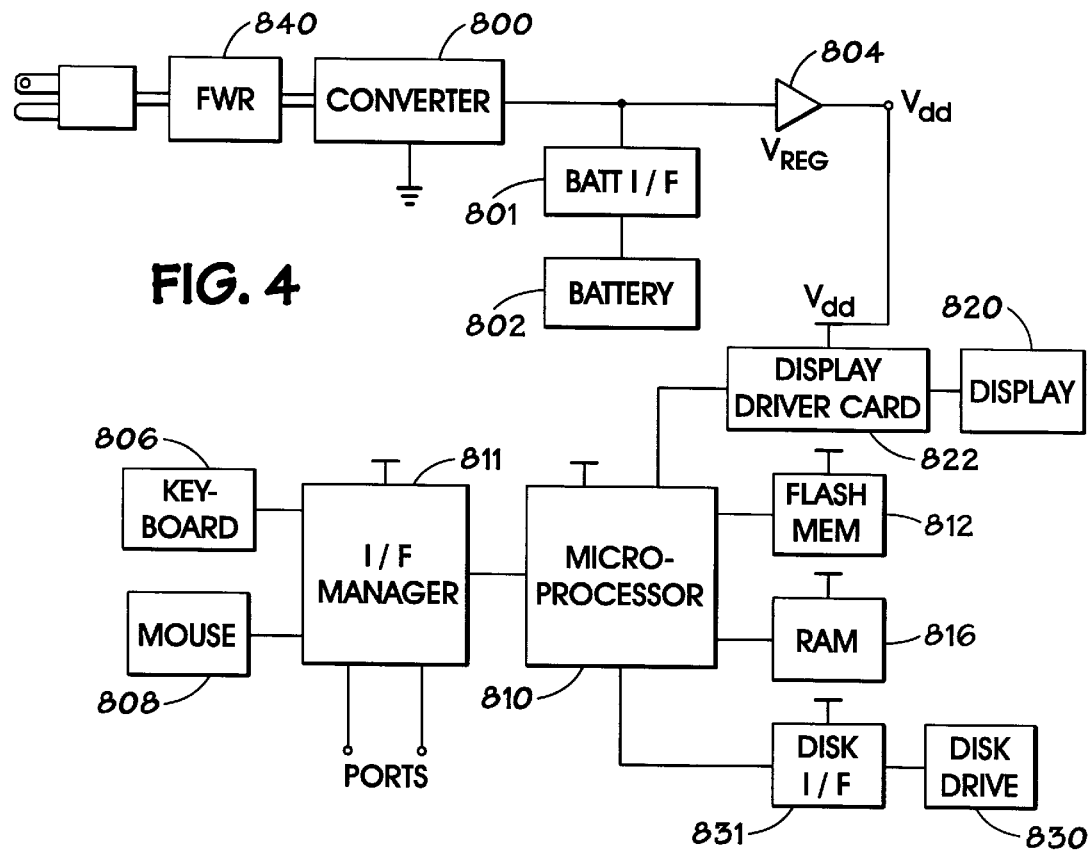
FIG. 4 shows a block diagram of a portable computer utilizing the innovative charging circuit and method.

FIG. 4 depicts a portable computer utilizing the innovative charging circuit and method. The embodiment shown includes a power converter 800 which is used to charge the battery 802. Optionally, a battery charge circuit 801 is interposed between the battery and the rest of the circuitry. The power converter is connected, through a full-wave bridge rectifier (FWR) 840 (which together with the converter form an AC adapter), to draw power from AC mains, and is connected to provide a DC voltage to the battery. The battery 802 (or the converter 800), connected through a voltage regulator 804, is able to power the complete portable computer system, which includes, in this example: user input devices (e.g. keyboard 806 and mouse 808); at least one microprocessor 810 which is operatively connected to receive inputs from said input device, through an interface manager chip 811 (which also provides an interface to the various ports); a memory (e.g. flash memory 812 and RAM 816), which is accessible by the microprocessor; a data output device (e.g. display 820 and display driver card 822) which is connected to output data generated by microprocessor; and a magnetic disk drive 830 which is read-write accessible, through an interface unit 831, by the microprocessor.

Optionally, of course, many other components can be included, and this configuration is not definitive by any means.

Figure 5:
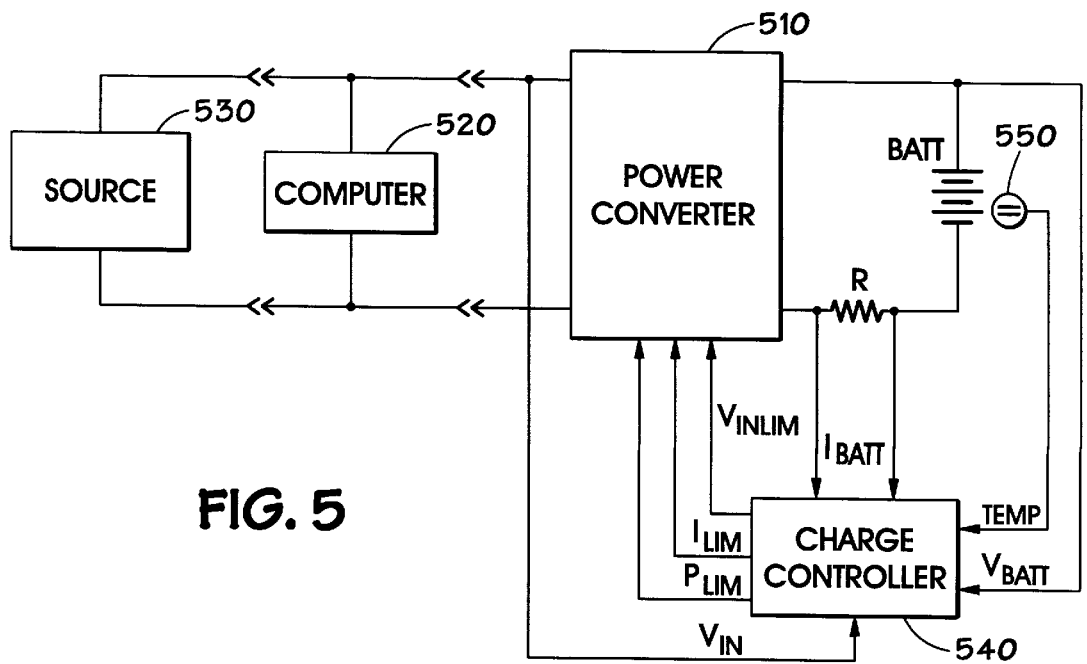
FIG. 5 is a prior art charging circuit.

FIG. 5 shows a high-level block diagram of the preferred embodiment with added control features. A power source 530 provides power to a portable computer 520 and a power converter 510. The power converter 510 regulates charge current to a battery BATT. A battery charge control circuit 540 provides $V_{inlim}$ (voltage limit), $I_{lim}$ (current limit), and $P_{lim}$ (power limit) control signals to power converter 510. These control signals are typically determined by some combination of inputs $V_{in}$ (input voltage to the power converter 510), $I_{batt}$ (current through the battery), $V_{batt}$ (voltage across the battery), and TEMP (battery temperature detected by a sensor 550).

Figure 6:
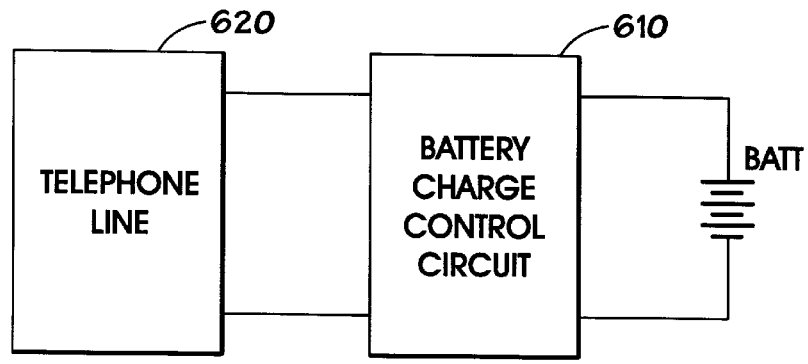
FIG. 6 shows a battery charger incorporating the innovative circuit to charge a battery from power present on a telephone line.

FIG. 6 shows a block diagram of a battery charger incorporating the innovative circuit to charge a battery from power present on a telephone line. A battery charge control circuit 610 is functionally connected to a telephone line 620 and a battery BATT. The charge circuit 610 siphons off any available current to charge BATT. The telephone line has a predetermined voltage threshold below which communications quality begins to suffer dramatically. By setting the charge control circuit 610 above this degradation threshold, a battery may be charged from power present on the telephone line without affecting communications quality. When the line voltage starts to drop, charge circuit 610 automatically decreases its current draw as discussed above. Thus, the embodiment shown in FIG. 6 allows the phone line to be used simultaneously for communications and battery charging.

Figure 7:
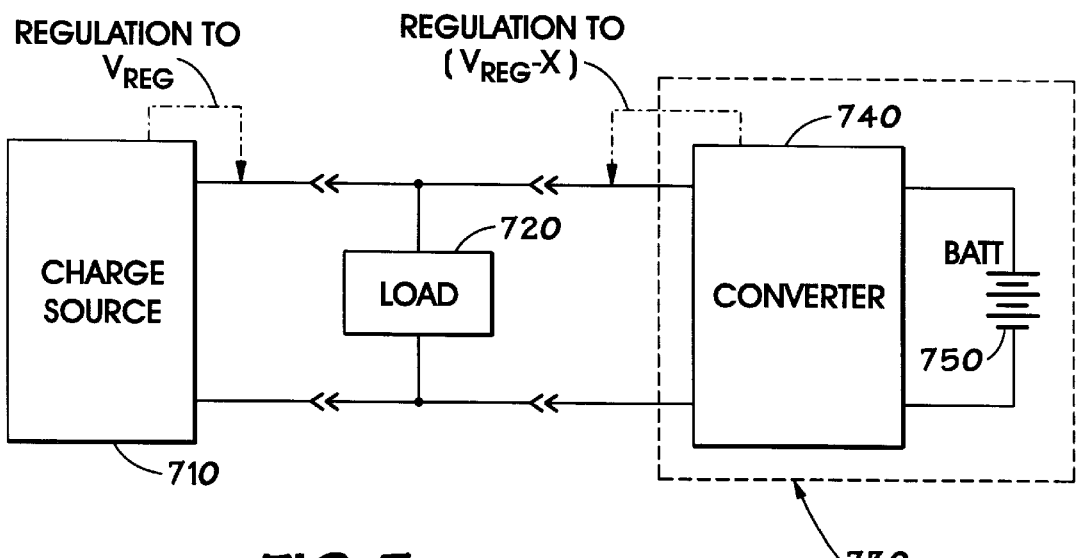
FIG. 7 shows a high-level block diagram of a constant voltage maximum power charger with a voltage source of unknown magnitude.

FIG. 7 shows a high-level block diagram of the constant voltage maximum power charger with a voltage source of unknown magnitude. A charge source 710 attempts to regulate the bus to some point Vreg. In this example, the value of Vreg is unknown. A dynamically varying load 720 and a smart battery 730 (comprised, in the embodiment shown, of a converter 740 incorporating the innovative max power charging circuit, and battery 750) are also connected to the bus. In order to allow use with a charge source 710 with an unknown $V_{reg}$, converter 740 samples the bus to determine $V_{reg}$. FIG. 7 also illustrates the regulation relationship of converter 740 to charge source 710. The smart battery 730 attempts to regulate the bus to some point lower than $V_{reg}$ (perhaps $V_{reg-x}$). As the power requirements of load 720 change dynamically, smart battery 730 automatically adjusts its power draw thereby regulating the bus to maintain maximum power output from charge source 710. In other words, battery 750 is charged until it gets all the current it needs or until converter 740 pulls the bus voltage down to $V_{reg-x}$.

According to a disclosed class of innovative embodiments, there is provided: A charging circuit, comprising: a first regulator functionally connected to drive a power bus up to a first set point; and a second regulator functionally connected to draw power from said power bus and supply power to an output; wherein said first regulator attempts to hold said power bus at said first set point; and wherein said second regulator is powered from said power bus, and is controlled not to pull the voltage of said power bus below a second set point which is lower than said first set point; whereby said first regulator is operated at approximately maximum output power.

According to another disclosed class of innovative embodiments, there is provided: A battery charging circuit, comprising: a charge source functionally connected to supply power to a power bus; and a smart battery functionally connected to said power bus; wherein said smart battery regulates voltage on said power bus while drawing current from said power bus, under at least some circumstances, such that said charge source is held at approximately maximum output power.

According to another disclosed class of innovative embodiments, there is provided: A battery charging system, comprising: a charge source; a power bus functionally connected to said charge source; a load functionally connected to said power bus; a battery charging circuit functionally connected to said power bus; and a battery functionally connected to said charging circuit; wherein said charging circuit allows battery current to flow over said power bus to said load without switching delays, when said charge source fails to provide power to said power bus.

According to another disclosed class of innovative embodiments, there is provided: A battery charging circuit, comprising: a constant voltage charge source; a power bus functionally connected to said constant voltage charge source; a dynamically varying load functionally connected to said power bus; a power converter functionally connected to said power bus; at least one battery cell functionally connected to said power converter; and a voltage sensing network functionally connected to said power bus; wherein said power converter accepts at least one input from said voltage sensing network; and wherein said power converter regulates current to said battery cell such that said constant voltage charge source is held near its maximum power output.

According to another disclosed class of innovative embodiments, there is provided: A battery pack subsystem, comprising: one or more battery cells; a power converter which is connected to selectably increase or decrease current applied to said battery cells during charging; and a sensing network functionally connected to said power converter, whereby a sense signal is input to said power converter to automatically limit battery charge current; wherein said sensing network senses charge available from a charge source in excess of charge required by a dynamically varying load connected to said charge source.

According to another disclosed class of innovative embodiments, there is provided: A battery pack subsystem, comprising: one or more battery cells; and a power converter which is connected to automatically begin regulation of charge current without additional circuitry to provide arbitration or overcurrent protection; wherein said power converter self-regulates to maximum power available from a charge source connected to a dynamically varying load.

According to another disclosed class of innovative embodiments, there is provided: A battery charging method, comprising the steps of: (a.) when an electronic device is on, supplying a dynamically varying amount of power from a main power supply to said electronic device and supplying all excess power to charge a battery of said electronic device; and (b.) when said electronic device is off, supplying power from said main power supply to charge said battery of said electronic device; wherein said excess power is power produced by said main power supply minus said dynamically varying amount of power supplied to said electronic device; and wherein said main power supply is held at its maximum output power by controlling current to said battery such that voltage from said main power supply is held slightly below its maximum.

According to another disclosed class of innovative embodiments, there is provided: A method for operating a portable electronic system, comprising the steps of: (a.) connecting power output terminals of a main power supply directly to a power bus which supplies power to a portable electronic system that consumes a dynamically varying amount of power; (b.) connecting power output terminals of a detachable battery module to said bus; and (c.) charging said detachable battery module with all excess power produced by said main power supply; wherein said main power supply is held near its maximum output power by controlling current to said battery such that voltage from said main power supply is held near its maximum.

According to another disclosed class of innovative embodiments, there is provided: A method for operating a portable electronic system, comprising the steps of: (a.) connecting power output terminals of a telephone utility line to a power bus; (b.) connecting power output terminals of a detachable battery module to said bus; and (c.) charging said detachable battery module with all excess power produced by said telephone line; wherein said telephone line is held above a predetermined threshold voltage by controlling current to said battery.

According to another disclosed class of innovative embodiments, there is provided: A computer system, comprising: a computer, comprising memory and a programmable processor, integrated in a common portable chassis; a power bus functionally connected to said programmable processor; a power supply functionally connected to supply power to said power bus, whereby power is supplied to said processor; and a rechargeable battery module for insertion into said computer, including: at least one battery cell; and a power converter functionally connected to said power bus to automatically begin regulation of battery charge current without additional circuitry to provide arbitration or overcurrent protection; wherein said power converter limits battery charge current to power not used by said computer.

According to another disclosed class of innovative embodiments, there is provided: A telephone system, comprising: a telephone, comprising a speaker and a microphone, integrated in a common chassis; a telephone line functionally connected to said telephone, whereby power is supplied to operate said telephone; and a rechargeable battery module for insertion into said telephone, including: at least one battery cell; and a power converter functionally connected to said power bus to automatically begin regulation of battery charge current without additional circuitry to provide arbitration or overcurrent protection; wherein said power converter limits battery charge current to power not used by said telephone.

According to another disclosed class of innovative embodiments, there is provided: A computer system, comprising: a computer, comprising memory and a programmable processor, integrated in a common portable chassis; a power bus functionally connected to said programmable processor; a modem functionally connected to a telephone line and to supply power to said power bus, whereby power may be supplied to said processor; and a rechargeable battery module for insertion into said computer, including: at least one battery cell; and a power converter functionally connected to said power bus to automatically begin regulation of battery charge current without additional circuitry to provide arbitration or overcurrent protection; wherein said power converter limits battery charge current to power not used by said computer.

Definitions

Alternating-Current (AC)

Electric current that reverses direction periodically, usually many times per second. An example of an AC power source is standard utility power from a wall electric outlet.

Constant Current Source

A circuit that produces a predetermined current, regardless of variations in load or input voltage.

Constant Power Source

A circuit that produces a predetermined power (by varying voltage and current produced), regardless of variations in load.

Constant Voltage Source

A circuit that produces a predetermined voltage, regardless of variations in load or applied current.

Direct-Current (DC)

Electric current that flows in one direction only, as opposed to alternating-current. An example of a DC power source is a battery.

Dynamically Varying Load

A load with an operating power requirement that varies over time, in essence a load that has peak periods of power consumption followed by periods of lesser power consumption. An example is a laptop computer, which may consume more power in some conditions, for example when reading a disk or when the screen brightens, than it consumes in other conditions.

Operational Amplifier (Op-amp)

A voltage amplifier having an output voltage proportional to the voltage difference between its two inputs.

Pulse-Width Modulator (PWM)

A circuit that varies the duration of a voltage pulse in response to input control signals. PWMs may be used in conjunction with a transistor to limit current flow in a circuit.

Smart Battery

A battery pack that includes power conversion and/or regulation circuitry between the battery and the power bus connectors.

The following background publications provide additional detail regarding possible implementations of the disclosed embodiments, and of modifications and variations thereof. A wide variety of converter topologies have been proposed. See generally Pressman, SWITCHING POWER SUPPLY DESIGN (1991); the 3 volumes of Middlebrook and Ćuk, ADVANCES IN SWITCHED-MODE POWER CONVERSION (2.ed. 1983); and all of the biennial UNITRODE POWER SUPPLY DESIGN SEMINAR HANDBOOKS; all of which are hereby incorporated by reference. Other references for background in this and related areas include the following: Billings, SWITCHMODE POWER SUPPLY HANDBOOK (1989); Chetty, SWITCH-MODE POWER SUPPLY DESIGN (1986); Chryssis, HIGH FREQUENCY SWITCHING POWER SUPPLIES (2.ed. 1989); Flanagan, HANDBOOK OF TRANSFORMER DESIGN & APPLICATIONS (2.ed. 1993); Gottlieb, POWER SUPPLIES, SWITCHING REGULATORS, INVERTERS, AND CONVERTERS (2.ed. 1994); Hoft, SEMICONDUCTOR POWER ELECTRONICS (1986); Lenk, SIMPLIFIED DESIGN OF SWITCHING POWER SUPPLIES (1995); Mazda, POWER ELECTRONICS HANDBOOK (1990); Mohan et al., POWER ELECTRONICS (2.ed. 1995); Nasar, ELECTRIC MACHINES AND TRANSFORMERS (1984); Nave, POWER LINE FILTER DESIGN FOR SWITCHED-MODE POWER SUPPLIES (1991); REACTIVE POWER: BASICS, PROBLEMS AND SOLUTIONS (ed. Sheble 1987); Severns and Bloom, MODERN DC-TO-DC SWITCHMODE POWER CONVERTER CIRCUITS (1984); Shepard, POWER SUPPLIES (1984); Sum, SWITCH MODE POWER CONVERSION (1988); Tihanyi, ELECTROMAGNETIC COMPATIBILITY IN POWER ELECTRONICS (1995); Williams, POWER ELECTRONICS (1987); Wood, SWITCHING POWER CONVERTERS (1981); the proceedings of the annual INTERNATIONAL HIGH-FREQUENCY POWER CONVERSION conferences from 1986 to date; and the proceedings of the POWERCON and POWER ELECTRONICS SPECIALISTS conferences from 1980 to date. All of these books, and the references cited in them, are hereby incorporated by reference.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the preferred embodiment uses a constant voltage power source because it is more efficient to deliver maximum power at constant voltage. Constant voltage sources are also less expensive to manufacture than constant current or constant power sources. However, with obvious modifications to the charge circuit, constant current or constant power sources could be substituted for the constant voltage source.

Control of the charge circuit could also be modified to actively determine voltage, current, power, or temperature for optimum battery charge.

Control of the charge circuit could also be modified to observe no-load Vsin (where Vsin is the external power source's regulation point) and set Vinlim accordingly to allow any unknown charge source to be used, i.e, Vinlim= 0.95 Vsin at no-load. This would require that the charge source voltage be higher than the battery voltage. This scheme would allow battery charging from a variety of sources, such as telephone lines, that are not normally used as power sources.

Control of the charge circuit could also be modified to regulate the highest cell voltage.

The charge circuit could also be modified to a boost or buck-boost type converter (or other such step-up/step-down topology) to allow battery charging from many sources (not just sources with a voltage greater than the battery voltage).

It should also be noted that the described innovations in circuitry and control relations can be combined with other control or circuit features, to produce other hybrid architectures which may differ in many details from the sample embodiments illustrated herein.

While the disclosed use of the innovative control architecture in a "smart" battery pack is particularly advantageous, the disclosed inventions are not limited to that context.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A charging circuit, comprising:
a first regulator functionally connected to drive a power bus up to a first set point; and
a second regulator functionally connected to draw power from said power bus and supply power to an output;
wherein said first regulator attempts to hold said power bus at said first set point; and
wherein said second regulator is powered from said power bus, and is controlled not to pull the voltage of said power bus below a second set point which is lower than said first set point;
whereby said first regulator is operated at approximately maximum output power.

2. The charging circuit of claim 1, further comprising a battery load functionally connected to said output of second regulator.

3. The charging circuit of claim 1, further comprising a dynamic load which is also connected to draw power from said power bus.

4. A battery charging circuit, comprising:
a charge source functionally connected to supply power to a power bus; and
a smart battery functionally connected to said power bus;
wherein said smart battery regulates voltage on said power bus while drawing current from said power bus, under at least some circumstances, such that said charge source is held at approximately maximum output power.

5. A battery charging system, comprising:
a charge source;
a power bus functionally connected to said charge source;
a load functionally connected to said power bus;
a battery charging circuit functionally connected to said power bus; and
a battery functionally connected to said charging circuit;
wherein said charging circuit allows battery current to flow over said power bus to said load without switching delays, when said charge source fails to provide power to said power bus.

6. A battery charging circuit, comprising:
a constant voltage charge source;
a power bus functionally connected to said constant voltage charge source;
a dynamically varying load functionally connected to said power bus;
a power converter functionally connected to said power bus;
at least one battery cell functionally connected to said power converter; and
a voltage sensing network functionally connected to said power bus;
wherein said power converter accepts at least one input from said voltage sensing network; and
wherein said power converter regulates current to said battery cell such that said constant voltage charge source is held near its maximum power output.

7. The battery charging circuit of claim 6, wherein said dynamically varying load is a portable computer.

8. A battery pack subsystem, comprising:
one or more battery cells;
a power converter which is connected to selectably increase or decrease current applied to said battery cells during charging; and
a sensing network functionally connected to said power converter, whereby a sense signal is input to said power converter to automatically limit battery charge current;
wherein said sensing network senses charge available from a charge source in excess of charge required by a dynamically varying load connected to said charge source.

9. The battery pack subsystem of claim 8, wherein said power converter comprises a buck converter.

10. The battery pack subsystem of claim 8, wherein said charge available is all charge produced by said charge source minus charge supplied to said dynamically varying load.

11. The battery pack subsystem of claim 8, wherein said dynamically varying load is a portable computer.

12. A battery pack subsystem, comprising:
one or more battery cells; and
a power converter which is connected to automatically begin regulation of charge current without additional circuitry to provide arbitration or overcurrent protection;
wherein said power converter self-regulates to maximum power available from a charge source connected to a dynamically varying load.

13. The battery pack subsystem of claim 12, wherein said maximum power available is power produced by said charge source minus power supplied to said dynamically varying load.

14. The battery pack subsystem of claim 12, wherein said dynamically varying load is a portable computer.

15. A battery charging method, comprising the steps of:
(a.) when an electronic device is on, supplying a dynamically varying amount of power from a main power supply to said electronic device and supplying all excess power to charge a battery of said electronic device; and
(b.) when said electronic device is off, supplying power from said main power supply to charge said battery of said electronic device;
wherein said excess power is power produced by said main power supply minus said dynamically varying amount of power supplied to said electronic device; and
wherein said main power supply is held at its maximum output power by controlling current to said battery such that voltage from said main power supply is held slightly below its maximum.

16. The method of claim 15, wherein said main power supply is a constant voltage source.

17. The method of claim 15, wherein said main power supply is a constant current source.

18. The method of claim 15, wherein said main power supply is a constant power source.

19. A method for operating a portable electronic system, comprising the steps of:
(a.) connecting power output terminals of a main power supply directly to a power bus which supplies power to a portable electronic system that consumes a dynamically varying amount of power;
(b.) connecting power output terminals of a detachable battery module to said bus; and
(c.) charging said detachable battery module with all excess power produced by said main power supply;
wherein said main power supply is held near its maximum output power by controlling current to said battery such that voltage from said main power supply is held near its maximum.

20. The method of claim 19, wherein said main power supply is a constant voltage AC/DC power supply.

21. The method of claim 19, wherein said excess power is power produced by said main power supply minus said dynamically varying amount of power supplied to said portable electronic system.

22. The method of claim 19, wherein said portable electronic system is a portable computer.

23. A method for operating a portable electronic system, comprising the steps of:

(a.) connecting power output terminals of a telephone utility line to a power bus;
(b.) connecting power output terminals of a detachable battery module to said bus; and
(c.) charging said detachable battery module with all excess power produced by said telephone line;
wherein said telephone line is held above a predetermined threshold voltage by controlling current to said battery.

24. The method of claim 23, wherein said power bus supplies power to a portable electronic system that consumes a dynamically varying amount of power.

25. The method of claim 24, wherein said portable electronic system is a telephone.

26. The method of claim 23, wherein said excess power is power produced by said telephone line minus a dynamically varying amount of power supplied to operate at least one telephone connected to said telephone line.

27. A computer system, comprising:
a computer, comprising memory and a programmable processor, integrated in a common portable chassis;
a power bus functionally connected to said programmable processor;
a power supply functionally connected to supply power to said power bus, whereby power is supplied to said processor; and
a rechargeable battery module for insertion into said computer, including:
at least one battery cell; and
a power converter functionally connected to said power bus to automatically begin regulation of battery charge current without additional circuitry to provide arbitration or overcurrent protection;
wherein said power converter limits battery charge current to power not used by said computer.

28. The computer system of claim 27, wherein said power supply is a constant voltage AC/DC power supply.

29. The computer system of claim 27, wherein said power converter comprises a buck converter.

30. A telephone system, comprising:
a telephone, comprising a speaker and a microphone, integrated in a common chassis;
a telephone line functionally connected to said telephone, whereby power is supplied to operate said telephone; and
a rechargeable battery module for insertion into said telephone, including:
at least one battery cell; and
a power converter functionally connected to said power bus to automatically begin regulation of battery charge current without additional circuitry to provide arbitration or overcurrent protection;
wherein said power converter limits battery charge current to power not used by said telephone.

31. The telephone system of claim 30, wherein said power converter limits battery charge current to prevent drawing voltage on said telephone line below a predetermined threshold.

32. The telephone system of claim 30, wherein said power converter comprises a buck converter.

33. A computer system, comprising:
a computer, comprising memory and a programmable processor, integrated in a common portable chassis;
a power bus functionally connected to said programmable processor;
a modem functionally connected to a telephone line and to supply power to said power bus, whereby power may be supplied to said processor; and a rechargeable battery module for insertion into said computer, including:
   at least one battery cell; and
   a power converter functionally connected to said power bus to automatically begin regulation of battery charge current without additional circuitry to provide arbitration or overcurrent protection;
wherein said power converter limits battery charge current to power not used by said computer.

34. The computer system of claim 33, wherein said power converter limits battery charge current to prevent drawing voltage on said telephone line below a predetermined threshold.

35. The computer system of claim 33, wherein said power converter comprises a buck converter.

\* \* \* \* \*